(12) United States Patent
Ota

(10) Patent No.: US 6,584,426 B2
(45) Date of Patent: *Jun. 24, 2003

(54) ELECTRONIC THERMOMETER

(75) Inventor: Hiroyuki Ota, Kyoto (JP)

(73) Assignee: Omron Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,905

(22) Filed: Oct. 26, 1999

(65) Prior Publication Data

US 2003/0074155 A1 Apr. 17, 2003

(30) Foreign Application Priority Data

Oct. 28, 1998 (JP) .............................. 10-306717

(51) Int. Cl.[7] .............................................. G06F 15/00
(52) U.S. Cl. ..................... 702/134; 374/126; 600/474
(58) Field of Search ........................ 702/81, 82, 130, 702/131, 134, 135; 374/126, 121, 158; 600/474

(56) References Cited

U.S. PATENT DOCUMENTS

| | | | |
|---|---|---|---|
| 4,602,642 A | * | 7/1986 | O'Hara et al. .............. 600/474 |
| 4,784,149 A | | 11/1988 | Berman et al. |
| 4,932,789 A | | 6/1990 | Egawa et al. |
| 5,150,969 A | * | 9/1992 | Goldberg et al. ............ 374/128 |
| 5,169,234 A | * | 12/1992 | Bohm ....................... 374/128 |
| RE34,507 E | * | 1/1994 | Egawa et al. ................ 374/126 |
| 5,469,855 A | * | 11/1995 | Pompei et al. .............. 600/474 |
| 5,725,308 A | * | 3/1998 | Smith et al. ................ 374/169 |
| 5,864,776 A | * | 1/1999 | Warren, Jr. et al. ......... 702/135 |
| 6,030,117 A | * | 2/2000 | Cheslock et al. ........... 374/158 |
| 6,056,435 A | * | 5/2000 | Pompei ...................... 374/133 |
| 6,149,297 A | * | 11/2000 | Beerwerth et al. .......... 374/121 |

FOREIGN PATENT DOCUMENTS

| | | |
|---|---|---|
| EP | 0 801 926 A1 | 10/1997 |
| WO | WO 97/19331 | 5/1997 |

* cited by examiner

Primary Examiner—Marc S. Hoff
Assistant Examiner—Mohamed Charioui
(74) Attorney, Agent, or Firm—Morrison & Foerster LLP

(57) ABSTRACT

An electronic thermometer including a probe to be inserted in to a portion of an outer ear to be measured by the thermometer, an infrared quantity detection means for detecting an infrared radiation quantity which is entered through the probe, a temperature computation means for applying the detected infrared radiation quantity in a predetermined computation expression to compute out a temperature such as body temperature, an infrared transmission data reading means for taking data corresponding to an infrared transmission quantity passing through the probe, and a control means for controlling the computation expression according to the taken data corresponding to the infrared transmission quantity.

13 Claims, 13 Drawing Sheets

(a)　　　　　　(b)

ELECTRONIC THERMOMETER

BACKGROUND OF THE INVENTION

1. Field of the Invention

This invention relates to an electronic thermometer employing infrared radiation, and more particularly to an ear type clinical thermometer that detects an infrared radiation quantity radiated from a tympanum to measure body temperature.

2. Description of the Related Art

As shown in FIG. 1, there is well known an ear type clinical thermometer having a probe (an infrared radiation input unit) 1 mounted by a probe cover 2 for stain or contagion protection on measurement. In such a conventional clinical thermometer, infrared radiation passing through the probe 1 is detected by an infrared radiation sensor 3, and applied to a CPU (central processing unit) 5 through an A/D (analog-to-digital) converter 4. Internal temperature of the clinical thermometer is detected by a temperature sensor 6, and applied to the CPU 5 through the A/D converter 4 in the same way. The CPU 5 detects temperature or body temperature based on the detected infrared radiation quantity and internal temperature to be indicated by a display 7. In this kind of clinical thermometer, attenuation of infrared radiation by the probe cover 2 is considered to detect the temperature from the infrared radiation quantity detected by the infrared radiation sensor 3. The conventional ear type clinical thermometer is designed to set a computation expression to correctly measure body temperature when the probe cover is mounted, but has a problem to indicate an abnormal measurement result when temperature is measured without mounting any probe cover.

SUMMARY OF THE INVENTION

It is, therefore, a primary object of this invention to provide an electronic thermometer capable of precisely measuring temperature such as body temperature without affection by the presence or absence of a probe cover nor by the kind of the probe cover.

According to this invention, there is provided an electronic thermometer including a probe to be inserted in to a portion of an outer ear to be measured by the thermometer, an infrared quantity detection means for detecting an infrared radiation quantity which is entered through the probe, a temperature computation means for applying the detected infrared radiation quantity in a predetermined computation expression to compute out temperature such as body temperature, an infrared transmission data reading means for taking data corresponding to an infrared transmission quantity passing through the probe, and a control means for controlling the computation expression according to the taken data corresponding to the infrared transmission quantity.

The taken data corresponding to the infrared radiation transmission quantity includes, in addition to the data of an infrared radiation quantity having passed the probe, data of an infrared radiation quantity to be passed through the probe, and data correlating to these transmitted infrared radiation quantities. In this electronic thermometer, for instance, an infrared radiation quantity entering through the probe from a tympanum is detected by the infrared quantity detection means, and temperature (body temperature) is computed out by the temperature computation means according to a predetermined computation expression based on the detected infrared radiation quantity. The data corresponding to the infrared radiation quantity is taken by infrared quantity detection means, the computation expression is controlled by the taken data, for instance, constants are revised. Accordingly, even if an infrared radiation transmission quantity by the probe is different, right temperature (body temperature) can be measured by doing compensation by the difference.

BRIEF DESCRIPTION OF THE DRAWINGS

Other objectives and advantages of this invention will be more readily apparent from the following detailed description provided in conjunction with the following figures, of which.

DETAILED DESCRIPTION OF THE PREFERRED EMBODIMENTS

Figure 1:
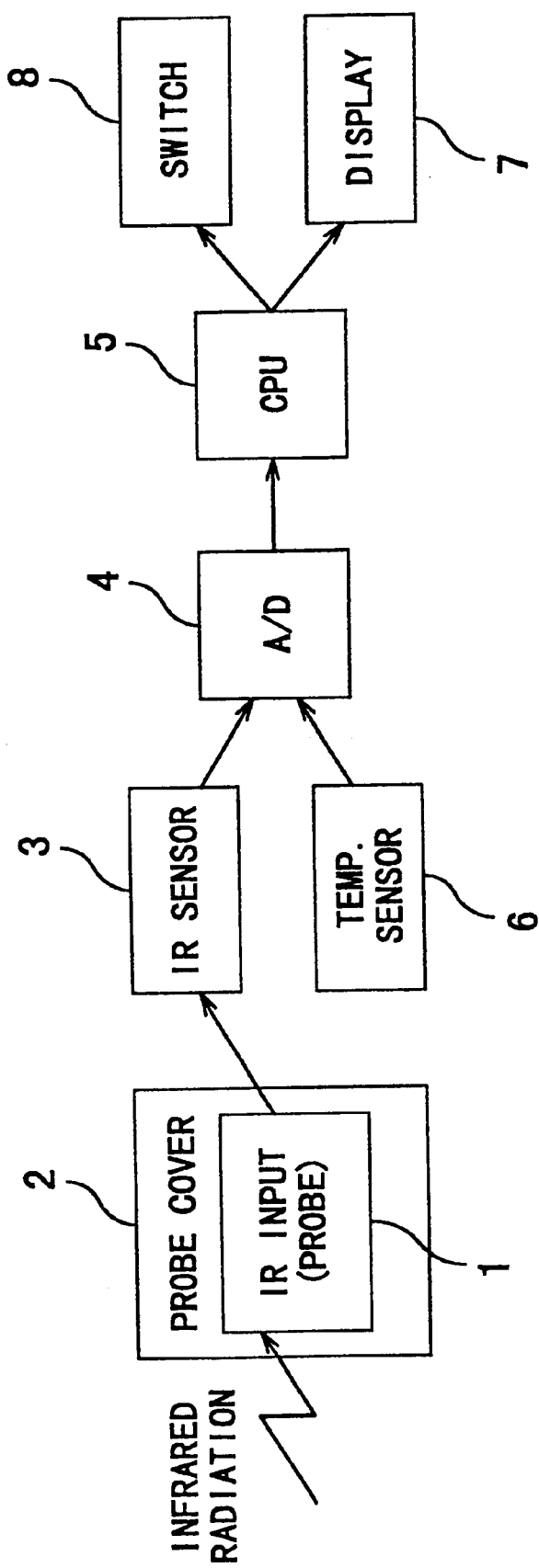
FIG. 1 is a schematic block diagram of a conventional ear type clinical thermometer.
Figure 2:
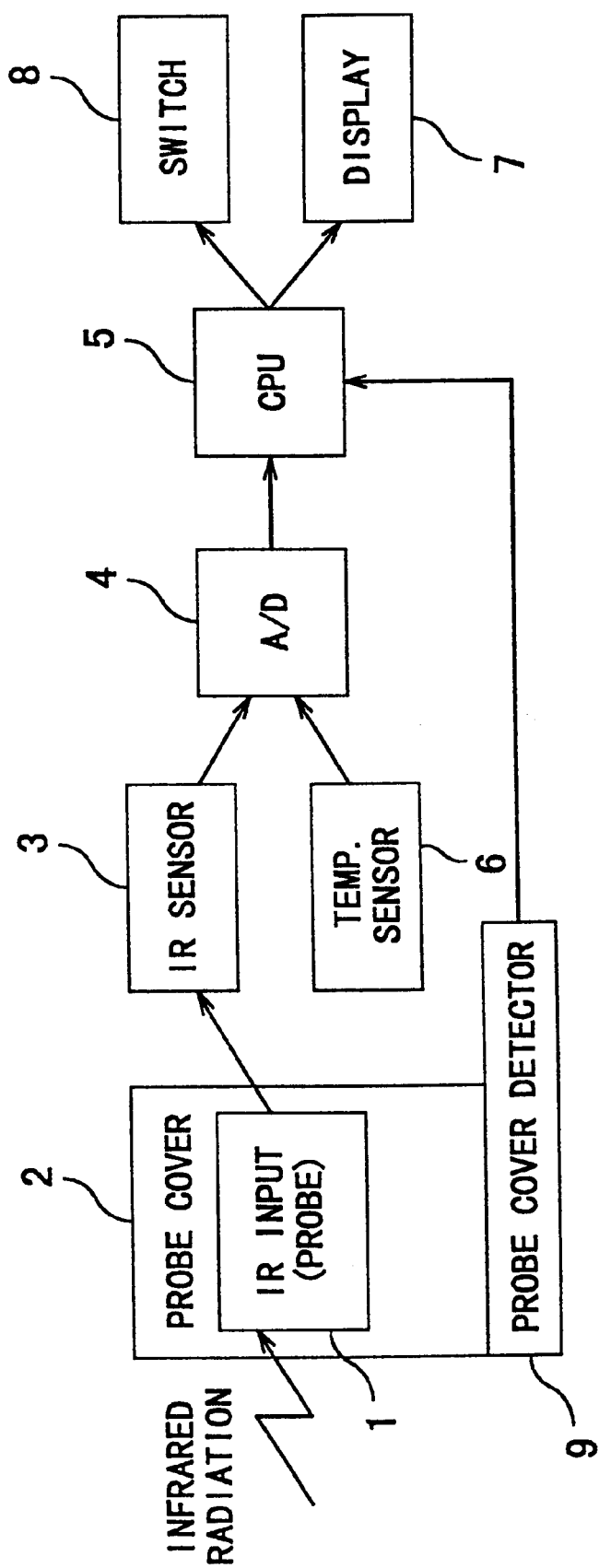
FIG. 2 is a schematic block diagram of an ear type clinical thermometer as a preferred embodiment of this invention.

Referring, now, to FIG. 2, there is shown a schematic block diagram of an ear type clinical thermometer as a first embodiment of this invention, which includes an infrared radiation (IR) input unit (probe) 1, a probe cover 2, an infrared radiation sensor 3, an analog-to-digital (A/D) converter 4, a central processing unit (CPU) 5, a temperature sensor 6, a display 7, and an operation switch 8. These components are same as those of the prior art of FIG. 1, but the thermometer of this embodiment is characterized by employing a probe cover detector 9 for detecting whether or not the probe cover 2 is mounted.

The probe cover detector employs 9 may employ a switch, such as a button switch, a lead switch, an photoelectric switch and so forth, which is turned ON when the probe cover 2 is mounted. The thermometer of this embodiment stores therein a computation expression Tx=k×Ts+Ta, in which "k" represents a constant relating to an infrared radiation transmission quantity, "Ts" represents an infrared radiation sensor output, and "Ta" represents a temperature sensor output. As temperature measurement starts after inserting the probe 1 into an outer ear, an infrared radiation quantity from a tympanum is detected by the infrared radiation sensor 3 and internal temperature also is detected by the temperature sensor 6, which are applied to CPU 5. The probe cover detector 9 detects the presence or absence of the probe cover 2, and the data representing the presence or absence is applied to the CPU 5. In accordance with the presence or absence of the probe cover, the CPU 5 chooses $K=k_1$ when the cover exists, and $K=k_2$ when the cover does not exist to compute out Tx=k×Ts+Ta, thereby performing correct measurement viewing an infrared radiation quantity according to the presence or absence of the probe cover ($k_1$ and $k_2$ are values corresponding to infrared radiation transmission quantities).

Figure 3:
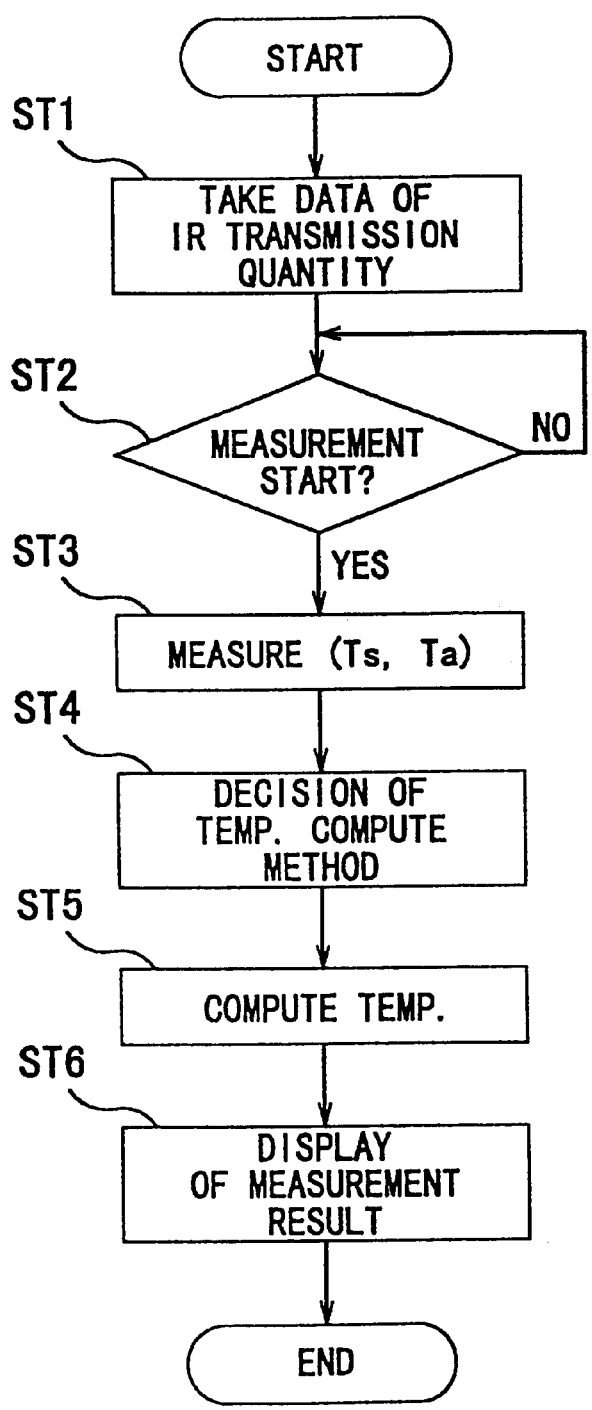
FIG. 3 is a flow chart showing a main routine in an operation of the ear type clinical thermometer of the embodiment.

FIG. 3 shows a flow chart showing a main routine in an operation of the ear type clinical thermometer of this embodiment. The CPU 5 of the thermometer takes data of an infrared radiation quantity (step ST1), judges if the measurement is started or a measurement switch is turned ON (step ST2). When the measurement is started, the infrared radiation quantity Ts is measured by the infrared radiation sensor 3, and the internal temperature Ta is measured by the temperature sensor 6 (step ST3). Based on the taken data of the infrared radiation transmission quantity, temperature compute method is determined (step ST4), temperature is computed by the temperature compute method (step ST5), the computation result is shown by the display 7 (step ST6), and the measurement is finished. There may be proposed several methods as described later to obtain the data of the above-described infrared radiation transmission quantity.

Figure 4:
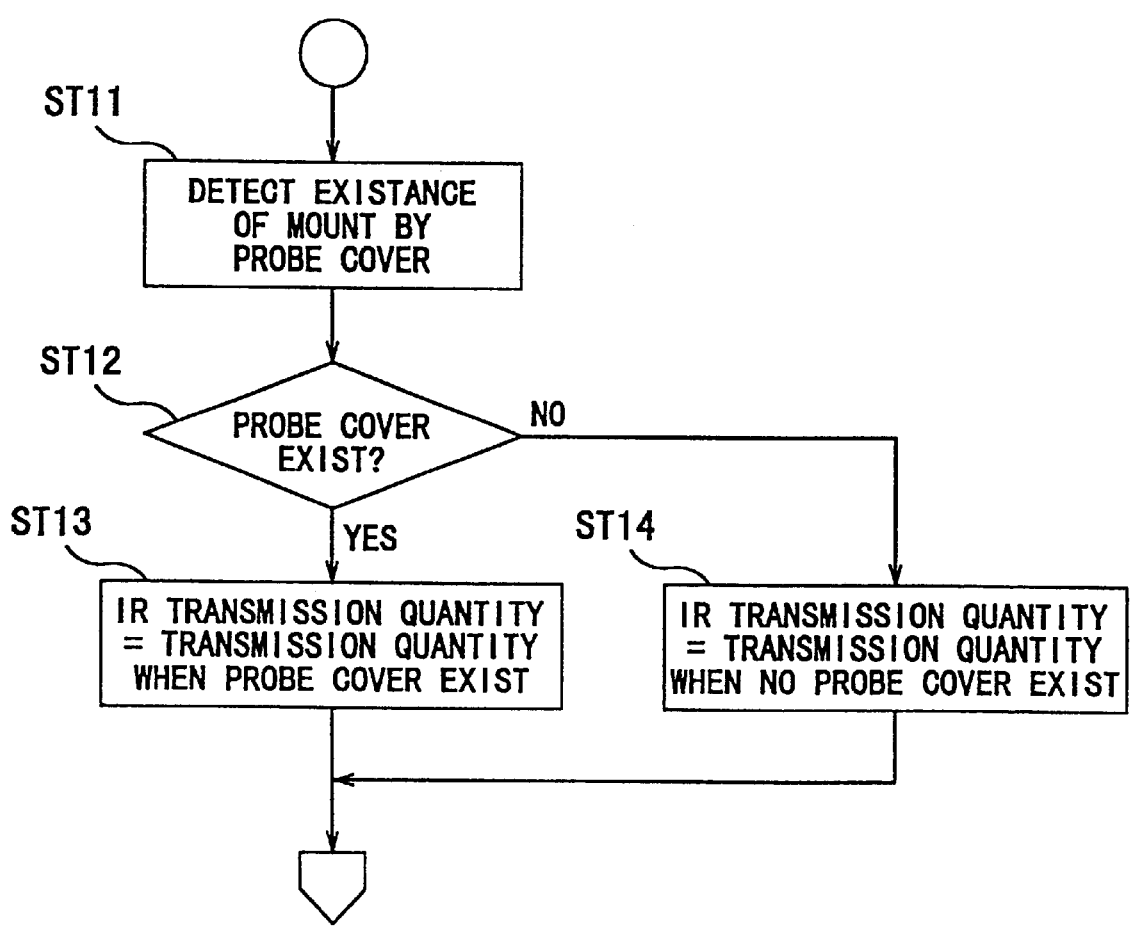
FIG. 4 is a flow chart showing a routine to take data of an infrared radiation quantity of the ear type clinical thermometer of the embodiment.

The ear type clinical thermometer shown in FIG. 2 is provided with the probe cover detector 9, wherein the presence or absence of the detected probe cover becomes a value or data corresponding to the infrared radiation quantity. Accordingly, in the clinical thermometer in this embodiment, the process in the step ST1 is provided to detect the presence or absence of the mount by a probe cover (step ST11), to judge if any probe cover exists (step ST12), to regard the infrared radiation quantity on the presence of a probe cover as a transmission quantity when a probe cover exists (step ST13) and the infrared radiation quantity on the absence of any probe cover as a transmission quantity when no probe cover exists (step ST14) to be returned, as shown by the flow chart of a subroutine shown in FIG. 4. In the step ST4, an expression Tx=$k_1$×Ts+Ta is chosen when the probe cover exists, and an expression Tx=$k_2$×Ts+Ta is chosen when no probe cover exists.

Figure 5:
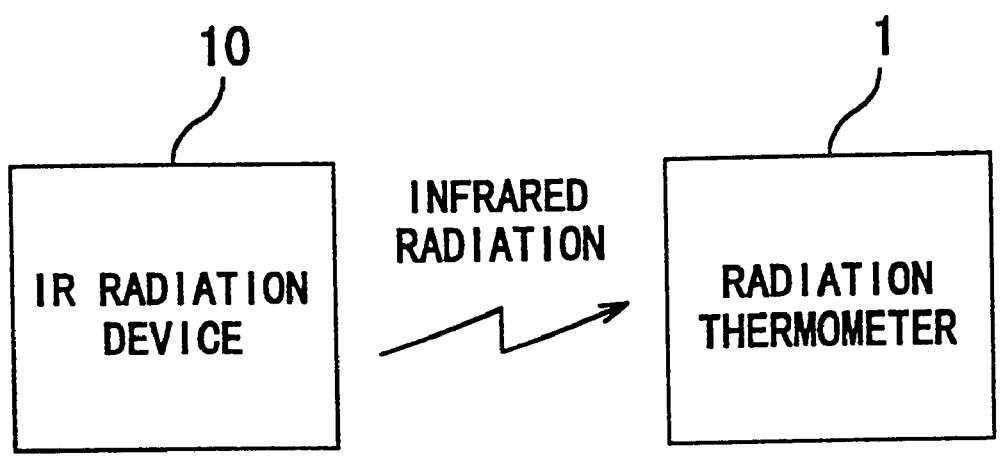
FIG. 5 is a schematic block diagram of a modification of the ear type clinical thermometer of the preferred embodiment in FIG. 1.
Figure 6:
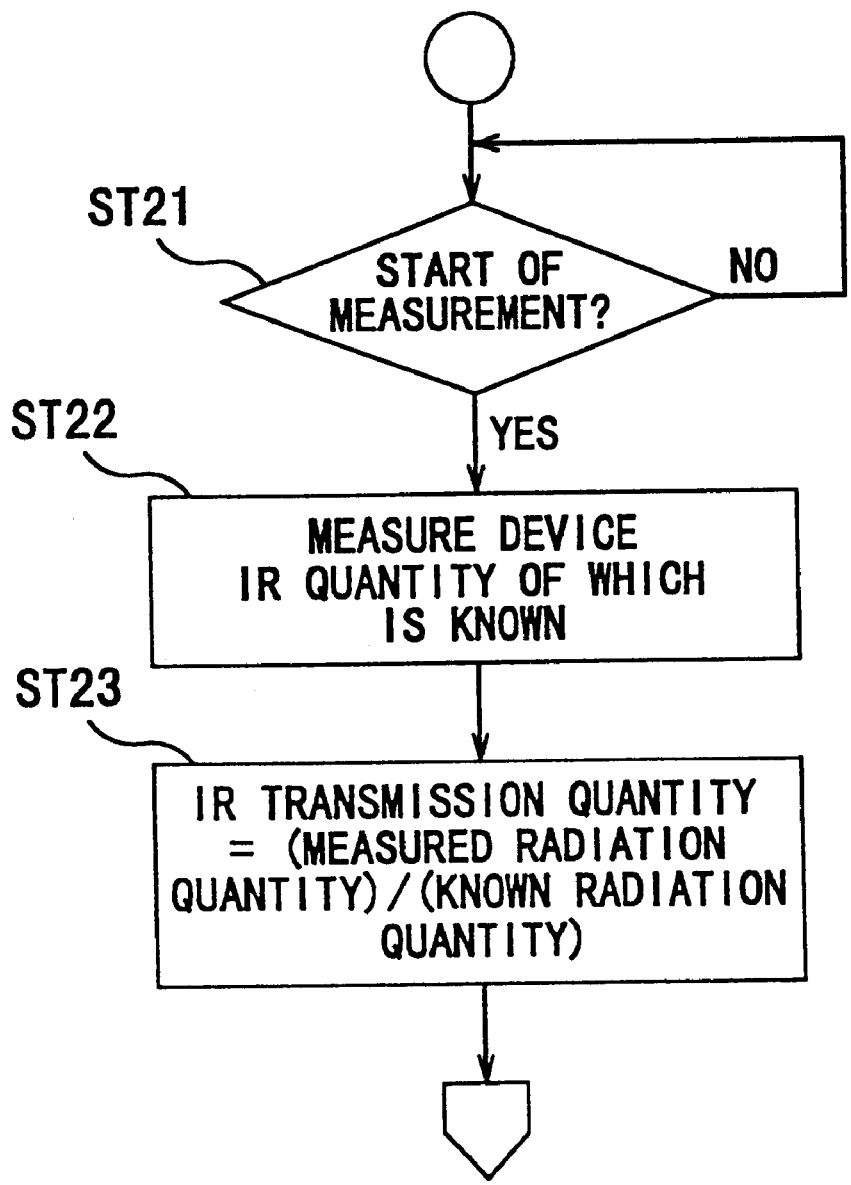
FIG. 6 is a flow chart showing a routine to take data of an infrared radiation quantity of the modified ear type clinical thermometer.

As a modification of the ear type clinical thermometer of this embodiment, the probe cover detector 9 may be replaced by an infrared radiation device 10 which radiates a known infrared radiation quantity to be received by a radiation thermometer 1 to obtain infrared radiation transmission data as shown in FIG. 5. The radiation 1 may employ the circuit diagram of FIG. 1. As shown by flow chart of a subroutine in FIG. 6, the radiation thermometer 1 upon start of measurement (step ST21) measures an infrared quantity of the infrared radiation device 10 with known infrared radiation quantity by an infrared radiation sensor 3 (step ST22), subsequently measures by the infrared radiation sensor 3 an infrared radiation quantity of an object to be measured for computing by an expression of (infrared transmission quantity)=(measured radiation quantity)/(known radiation quantity) (step ST23).

Figure 7:
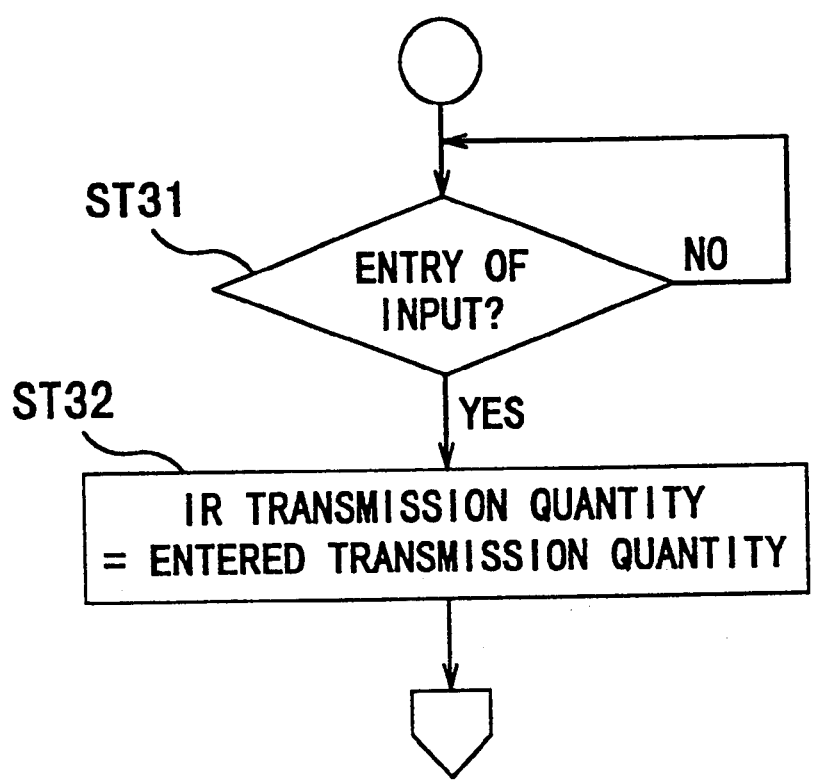
FIG. 7 is a flow chart showing a routine to take data of an infrared radiation quantity of an ear type clinical thermometer as another modification of the preferred embodiment.

As another modification of the ear type clinical thermometer, the data of an infrared radiation transmission quantity may be entered by a ten-key. In a subroutine of the modified clinical thermometer shown in FIG. 7, upon entry of the key, the entry of input is confirmed (step ST31), and the entered transmission quantity is accepted as an infrared radiation transmission quantity (step ST32) for use of controlling the computation expression or decision of constants.

Figure 8:
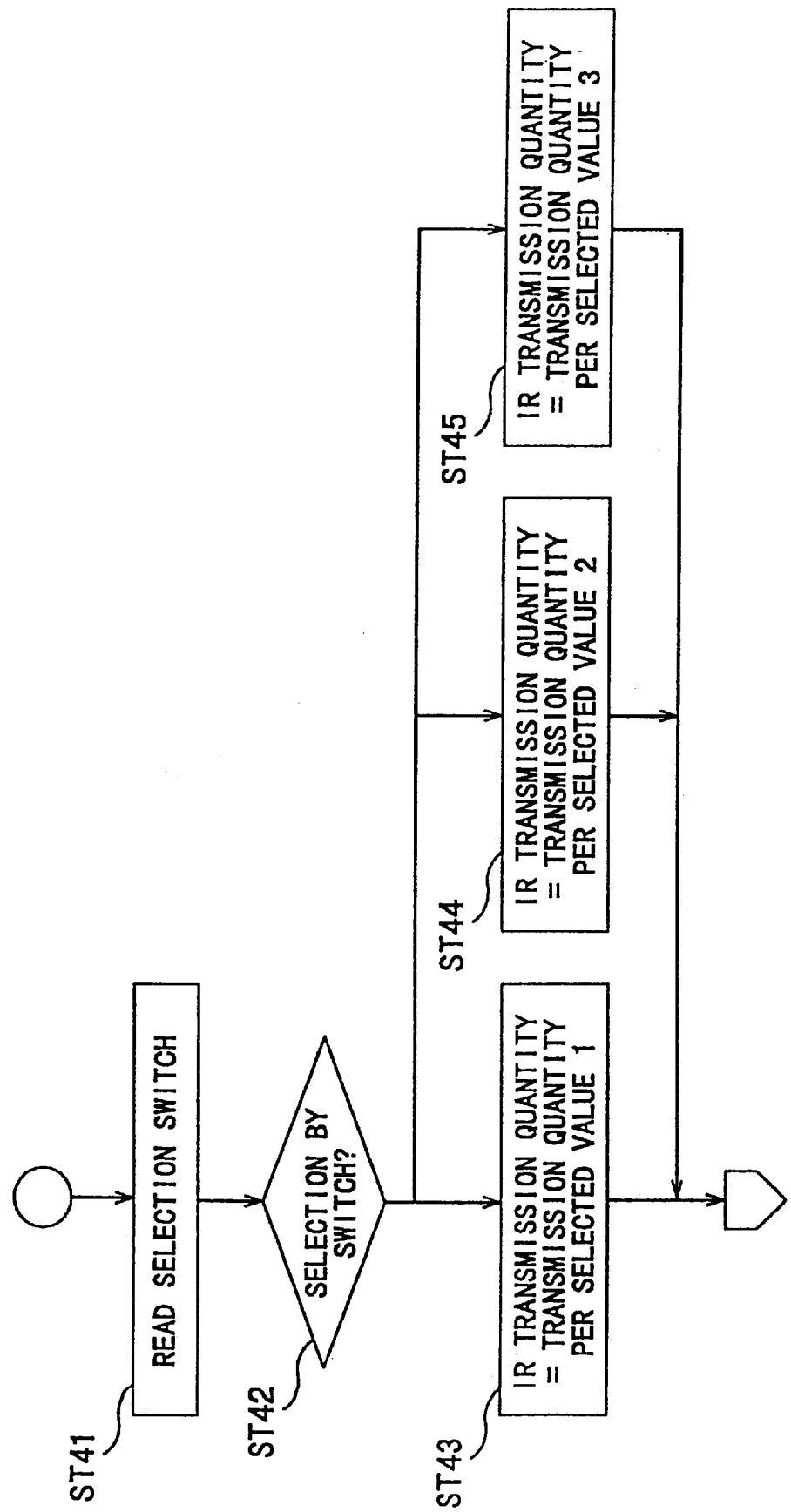
FIG. 8 is a flow chart showing a routine to take data of an infrared radiation quantity of an ear type clinical thermometer as still another modification of the preferred embodiment.

As still another modification of the ear type clinical thermometer, a plural kinds of infrared radiation transmission quantities of probe covers having different transmission quantities are set in CPU 5 beforehand, and an infrared radiation transmission quantity is selectively entered by a switch operation. As shown by a subroutine in FIG. 8, a selection switch is read (step ST41), it is identified which switch is selected (step ST42). If a switch 1 is chosen, a transmission quantity corresponding to selected value 1 is regarded as the infrared radiation transmission quantity (step ST43). If a switch 2 is chosen, a transmission quantity corresponding to selected value 2 is regarded as the infrared radiation transmission quantity (step ST44). If a switch 3 is chosen, a transmission quantity corresponding to selected value 3 is regarded as the infrared radiation transmission quantity (step ST45). Thus obtained respective infrared radiation transmission quantities may be used for controlling a computation expression, that is, decision of constants.

Figure 9:
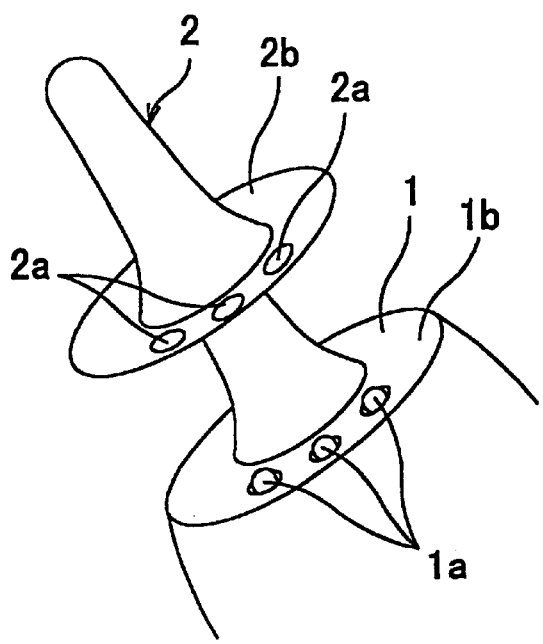
FIG. 9 is a perspective partial view of a probe and a probe cover of an ear type clinical thermometer as still another modification of the preferred embodiment.
Figure 10:
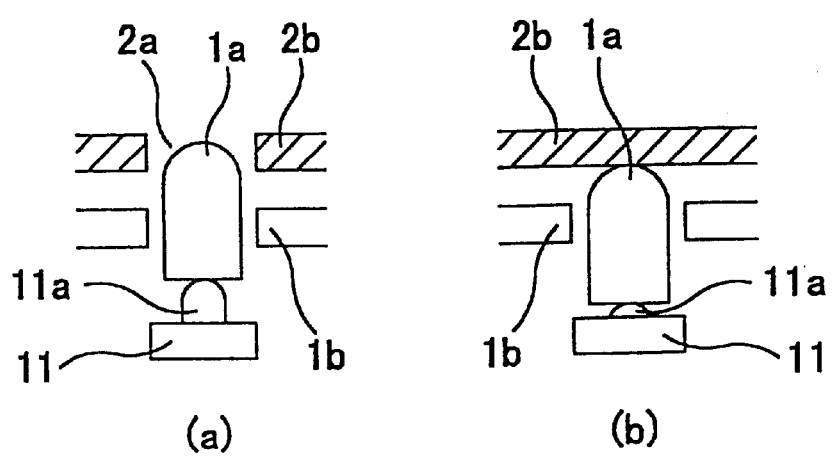
FIG. 10 is a sectional view showing an operation of detection of an infrared radiation transmission quantity in the modified ear type clinical thermometer of FIG. 9.

In FIGS. 9 and 10, there are shown schematic views of a probe 1 and a probe cover 2 of an ear type clinical thermometer as still another modification of the preferred embodiment of this invention. This modified thermometer is designed to employ a plurality of probe covers 2 having different infrared radiation transmission lights. Each probe cover 2 at a flange 2b thereof is provided with three reading holes 2a, wherein each kind is represented by bit codes from 000 to 111 in which "0" represents a through hole, and "1" represents no hole. Buttons 11a of button switches 11 are exposed from a step 1b of the probe 1 of the main body confronting the reading holes 2a of the probe cover 2. As the probe cover 2 is mounted on the probe 1, the button 11a is not depressed and remains to be OFF in case the reading hole 2a is through hole as shown in FIG. 10 at (a), but is depressed and turned to ON in case the reading hole 2a is closed or does not exist as shown in FIG. 10 at (b). Thus, the kind of each probe cover 2 may be identified by the main body of the thermometer.

Figure 11:
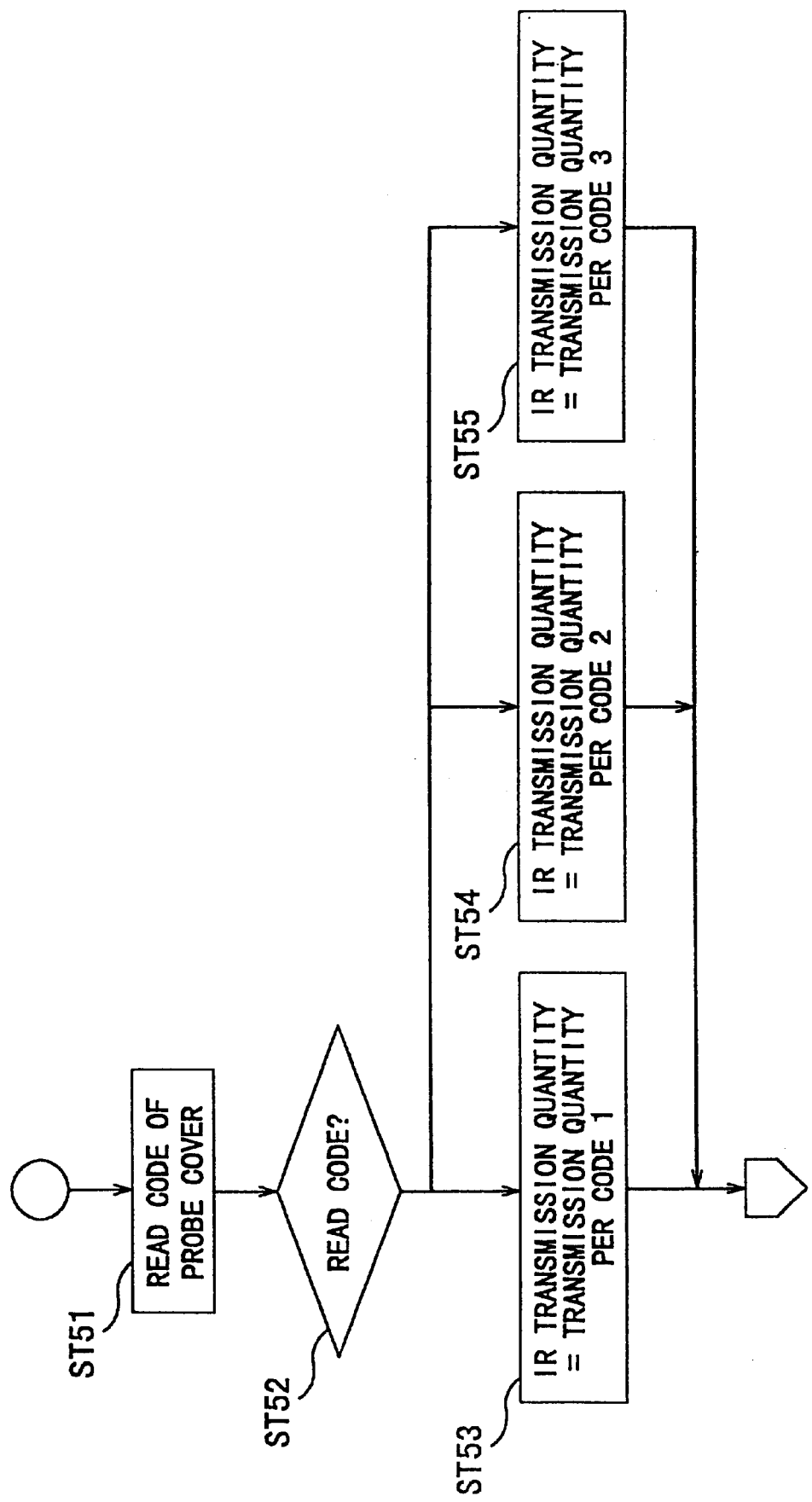
FIG. 11 is a flow chart showing a routine to take data of an infrared radiation quantity of the modified ear type clinical thermometer.

FIG. 11 shows a subroutine of this modified thermometer. First, the code of a probe cover is read (step ST51), and it is judged which kind is designated by the read code (set ST52). As a result of the judgement, if it is code 1 (001), the transmission quantity corresponding to the code 1 is regarded as infrared radiation quantity (step ST53). If it is code 2 (010), the transmission quantity corresponding to the code 2 is regarded as infrared radiation quantity (step ST54). If it is code 3 (011), the transmission quantity corresponding to the code 3 is regarded as infrared radiation quantity (step ST55). The computation expression is controlled according to the respectively obtained infrared radiation transmission rays.

Figure 12:
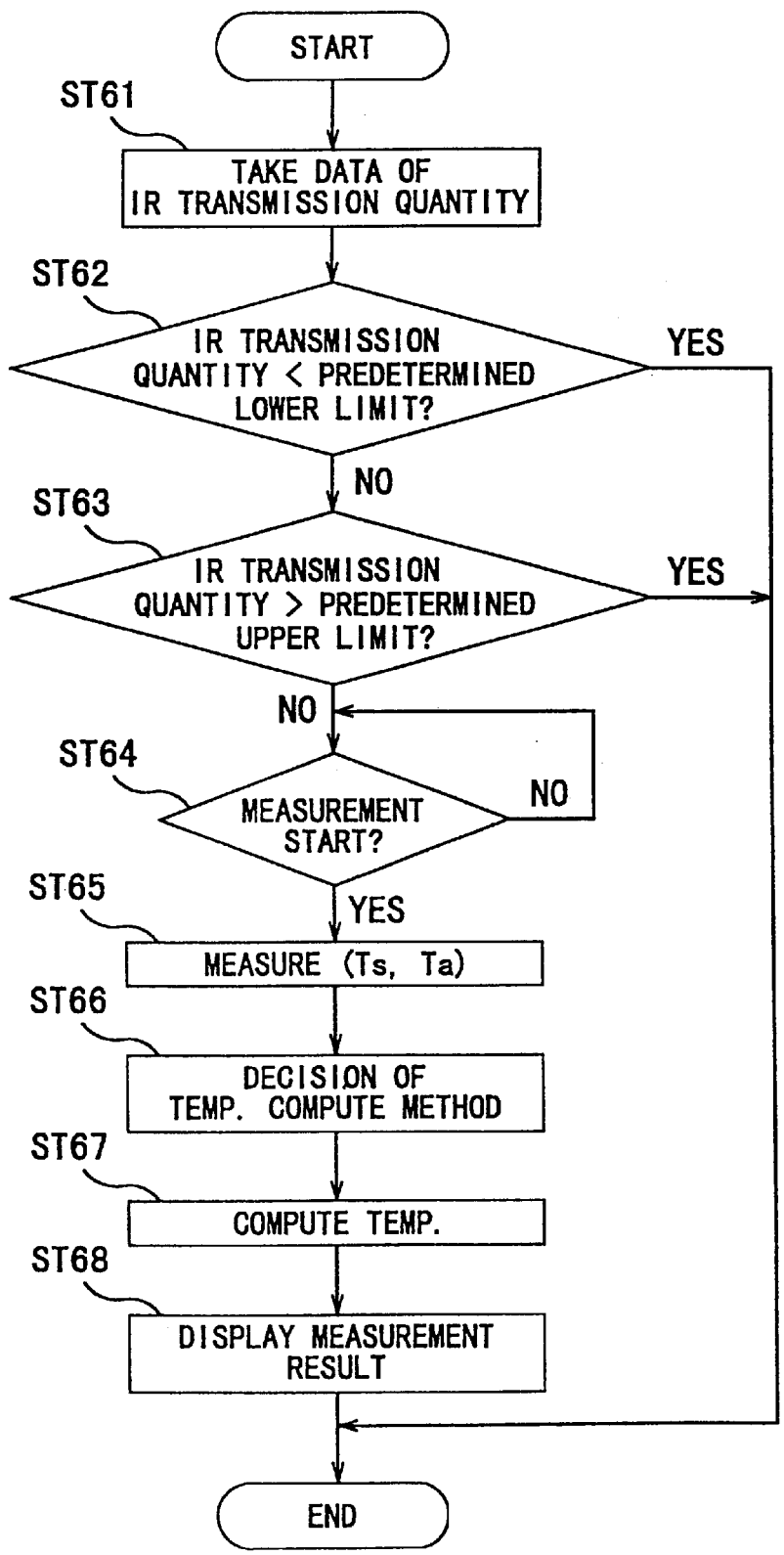
FIG. 12 is a flow chart of an operation in an ear type clinical thermometer as a still another modification of the preferred embodiment of this invention.

In FIG. 12, there is shown a flow chart of an operation in still another modification of the ear clinical thermometer. As data of infrared radiation transmission quantity is taken (step ST61), it is inquired if the quantity is lower than a predetermined lower limit (step ST62). If it is larger than the lower limit, it is inquired if the quantity is larger than a predetermined upper limit (step ST63). When NO response is made, that is, the infrared radiation transmission quantity is between the upper limit and the lower limit, the sequence waits the manipulation of a measurement start switch (step ST64), and the measurement starts to obtain an infrared radiation quantity Ts and an internal temperature Ta (step ST65), decides a temperature compute method from the infrared radiation transmission quantity (step ST66), computes out a temperature based on the detected infrared radiation quantity Ts and internal temperature Ta (step ST67), and indicates a result of the measurement (step ST68). When the response from step ST62 or ST63 is YES, viz., the infrared radiation transmission quantity is lower than the predetermined lower limit or larger than the predetermined upper limit, the sequence ends without any measurement operation.

Figure 13:
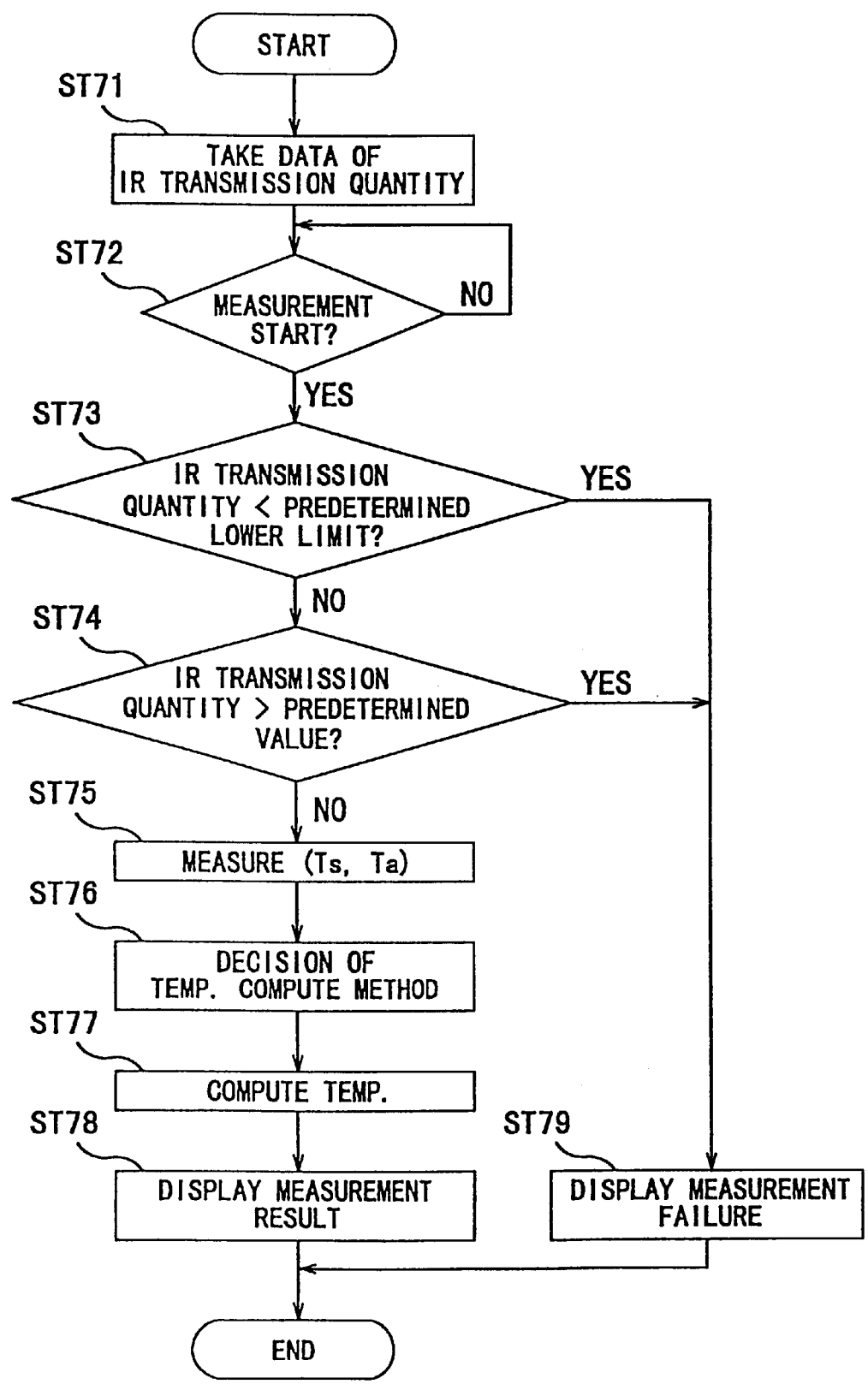
FIG. 13 is a flow chart of an operation in an ear type clinical thermometer as a still another modification of the preferred embodiment.

FIG. 13 shows a flow chart of an operation of still another modification of the ear type clinical thermometer of FIG. 12, in which the sequence (steps from ST71 to ST78) when the infrared radiation transmission quantity is between predetermined upper limit and lower limit is the same as that of FIG. 12. In this modified thermometer, if the infrared radiation transmission quantity is lower than the predetermined lower limit or larger than the predetermined upper limit, a measurement failure is displayed (step ST79).

Figure 14:
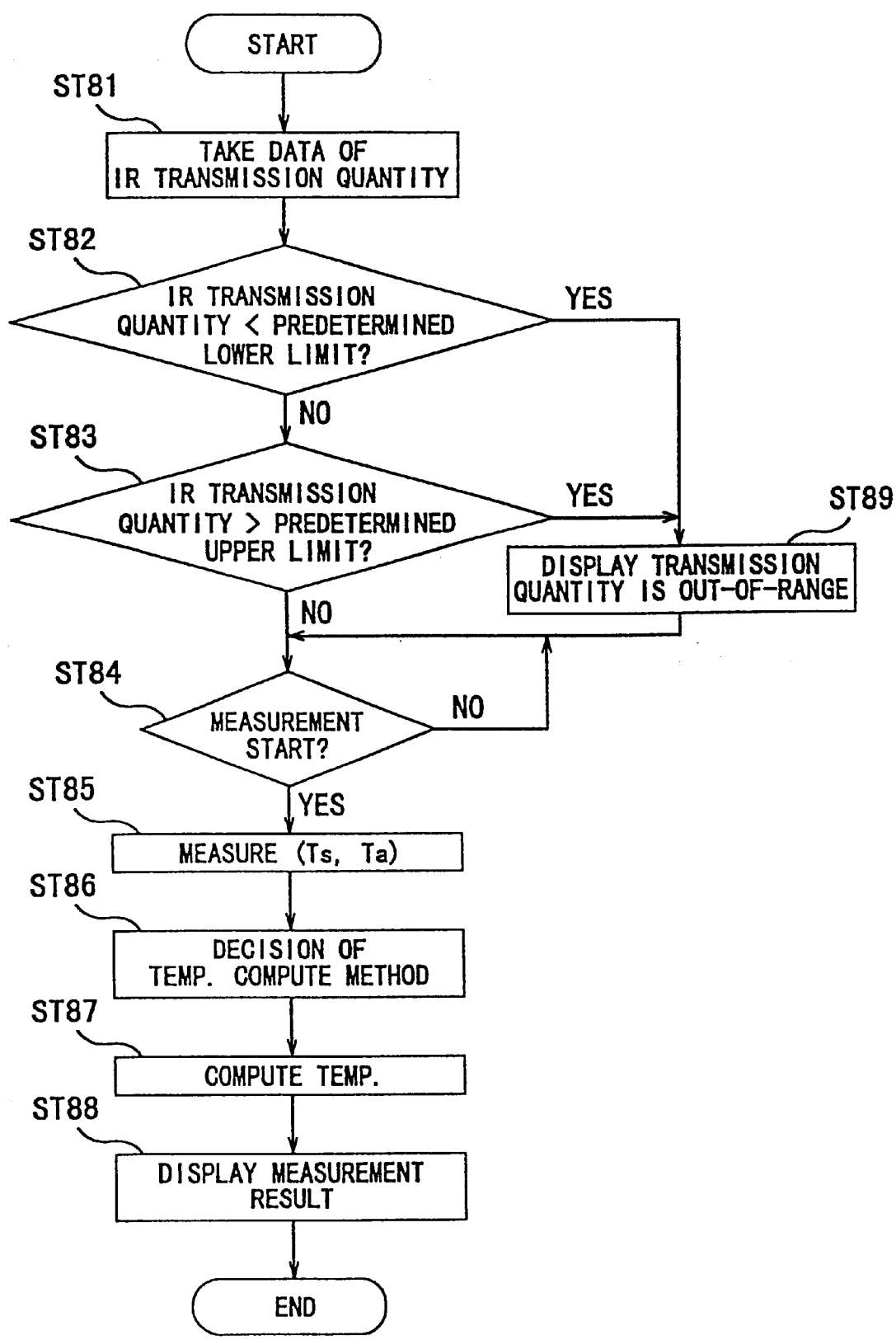
FIG. 14 is a flow chart of an operation in an ear type clinical thermometer as a still another modification of the preferred embodiment.

FIG. 14 shows a flow chart of an operation of still another modification of the ear type clinical thermometer of FIG. 12, in which the sequence (steps from ST81 to ST88) when the infrared radiation transmission quantity is between predetermined upper limit and lower limit is the same as that of FIG. 12. In this modified thermometer, if the infrared radiation transmission quantity is lower than the predetermined lower limit or larger than the predetermined upper limit, it is displayed that the infrared radiation transmission quantity is out-of-range (step ST89). In this modification, the measurement is executed as the measurement start switch is turned ON after out-of-range is displayed (steps ST84 to ST88).

Thus, according to the above-mentioned embodiments and modifications, an infrared radiation transmission quantity of a probe is detected and a computation expression for temperature is chosen according to the detected infrared radiation transmission quantity, it may be avoided that an anomalous value is displayed when any probe cover is not mounted. Correct temperature such as body temperature may be measured irrelevant to the presence or absence of a probe cover.

Though foregoing embodiments have been applied to ear type clinical thermometers, this invention may be widely applied to other thermometers. Having described embodiments of this invention, it will now be apparent to those skilled in the art that many changes may be made without departing from the inventive concepts. It is felt, therefore, that the invention should not be restricted to its disclosed embodiments, but rather should be limited only by the spirit and scope of the appended claims.

What is claimed is:

1. An electronic thermometer comprising a probe to be inserted in to a portion to be measured by the thermometer, infrared quantity detection means for detecting an external infrared radiation quantity which enters through said probe, temperature computation means for applying the detected infrared radiation quantity in a predetermined computation expression to compute temperature, infrared transmission data reading means for taking data corresponding to an infrared transmission quantity passing through said probe, control means for controlling said computation expression according to said taken data corresponding to the infrared transmission quantity, and a probe cover for detachably covering said probe, wherein said control means includes means for determining the type of probe cover and said control means determines the infrared transmission quantity corresponding to said probe cover, wherein said infrared transmission data reading means includes a plurality of infrared radiation transmission quantities set beforehand, and said control means controls the computation expression according to the infrared radiation quantity selected by an external operation means.

2. An electronic thermometer according to claim 1, further compromising means for judging whether the taken data of the infrared transmission quantity is not more than a predetermined value, not less than the predetermined value or within a predetermined range.

3. An electronic thermometer according claim 2, further comprising means for prohibiting measurement as a result of the judgement by said judging means.

4. An electronic thermometer according to claim 2, further comprising means for showing a measurement failure as a result of the judgement by said judging means.

5. An electronic thermometer according to claim 2, further comprising means for displaying a result of the judgement by said judging means.

6. An electronic thermometer according to claim 1, in which control for the computation expression by said control means is executed by selecting a constant of the temperature computation expression among previously prepared constants.

7. An electronic thermometer according to claim 1, in which the control for the computation expression by said control means is executed by employing predetermined data of infrared transmission quantity and the taken data of the infrared transmission quantity as a constant of a temperature computation.

8. An electronic thermometer comprising a probe to be inserted in to a portion to be measured by the thermometer, infrared quantity detection means for detecting an external infrared radiation quantity which enters through said probe, temperature computation means for applying the detected infrared radiation quantity in a predetermined computation expression to compute temperature, infrared transmission data reading means for taking data corresponding to an infrared transmission quantity passing through said probe, control means for controlling said computation expression according to said taken data corresponding to the infrared transmission quantity, and a probe cover, wherein said probe cover includes data setting means disposed thereon as to an infrared transmission quantity, in which data of said infrared transmission quantity is taken by said infrared transmission data reading means and said control means controls the computation expression according to the taken data of infrared transmission quantity.

9. An electronic thermometer according to claim 8, further comprising means for judging whether the taken data of the infrared transmission quantity is not more than a predetermined value, not less than the predetermined value or within a predetermined range.

10. An electronic thermometer according to claim 9, further comprising means for prohibiting measurement as a result of the judgment by said judging means.

11. An electronic thermometer according to claim 9, further comprising means for showing measurement failure as a result of the judgment by said judging means.

12. An electronic thermometer according to claim 9, further comprising means for displaying a result of the judgment by said judging means.

13. An electronic thermometer according to claim 8, in which control for the computation expression by said control means is executed by selecting a constant of the temperature computation expression among previously prepared constants.

* * * * *